US 8,098,580 B2

(12) United States Patent
Frink

(10) Patent No.: US 8,098,580 B2
(45) Date of Patent: *Jan. 17, 2012

(54) PRIORITY SCHEDULING USING PER-PRIORITY MEMORY STRUCTURES

(75) Inventor: Craig R. Frink, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/508,966

(22) Filed: Jul. 24, 2009

(65) Prior Publication Data

US 2009/0285231 A1 Nov. 19, 2009

Related U.S. Application Data

(63) Continuation of application No. 10/876,624, filed on Jun. 28, 2004, now Pat. No. 7,583,596.

(51) Int. Cl.
*H04J 3/14* (2006.01)
*H04L 12/28* (2006.01)
*H04L 12/54* (2006.01)

(52) U.S. Cl. ........ 370/230.1; 370/235; 370/395.43; 370/429

(58) Field of Classification Search .......... 370/230.1, 370/235, 235.1

See application file for complete search history.

(56) References Cited

U.S. PATENT DOCUMENTS

| | | | |
|---|---|---|---|
| 5,533,020 A | 7/1996 | Byrn et al. | |
| 5,844,890 A | 12/1998 | Delp et al. | |
| 5,953,336 A * | 9/1999 | Moore et al. | 370/395.43 |
| 6,028,843 A * | 2/2000 | Delp et al. | 370/235 |
| 6,052,375 A | 4/2000 | Bass et al. | |
| 6,775,289 B1* | 8/2004 | Charny | 370/395.4 |
| 7,012,889 B1 | 3/2006 | Turner et al. | |
| 7,106,693 B1 | 9/2006 | Turner et al. | |
| 7,292,578 B1 | 11/2007 | Kerr et al. | |
| 7,457,247 B1 | 11/2008 | Frink | |
| 2002/0150047 A1 | 10/2002 | Knight et al. | |
| 2003/0231635 A1* | 12/2003 | Kalkunte et al. | 370/395.42 |
| 2004/0062261 A1 | 4/2004 | Zecharia et al. | |
| 2004/0187120 A1* | 9/2004 | Moore et al. | 718/100 |

OTHER PUBLICATIONS

Ruiu, Dragos, "Testing ATM Systems" Jun. 1994, IEEE Spectrum, p. 25-27.*
Co-pending U.S. Appl. No. 10/876,624, filed Jun. 28, 2004; Craig R. Frink, entitled "Priority Scheduling Using Per-Priority Memory Structures".
Co-pending U.S. Appl. No. 10/912,041, filed Aug. 6, 2004; Craig R. Frink, entitled "Hierarchical Shaping of Network Traffic".

* cited by examiner

*Primary Examiner* — Dang Ton
*Assistant Examiner* — Ryan Kavleski
(74) *Attorney, Agent, or Firm* — Harrity & Harrity, LLP

(57) ABSTRACT

A system schedules traffic flows on an output port using circular memory structures. The circular memory structures may include rate wheels that include a group of sequentially arranged slots. The traffic flows may be assigned to different rate wheels on a per-priority basis.

20 Claims, 14 Drawing Sheets

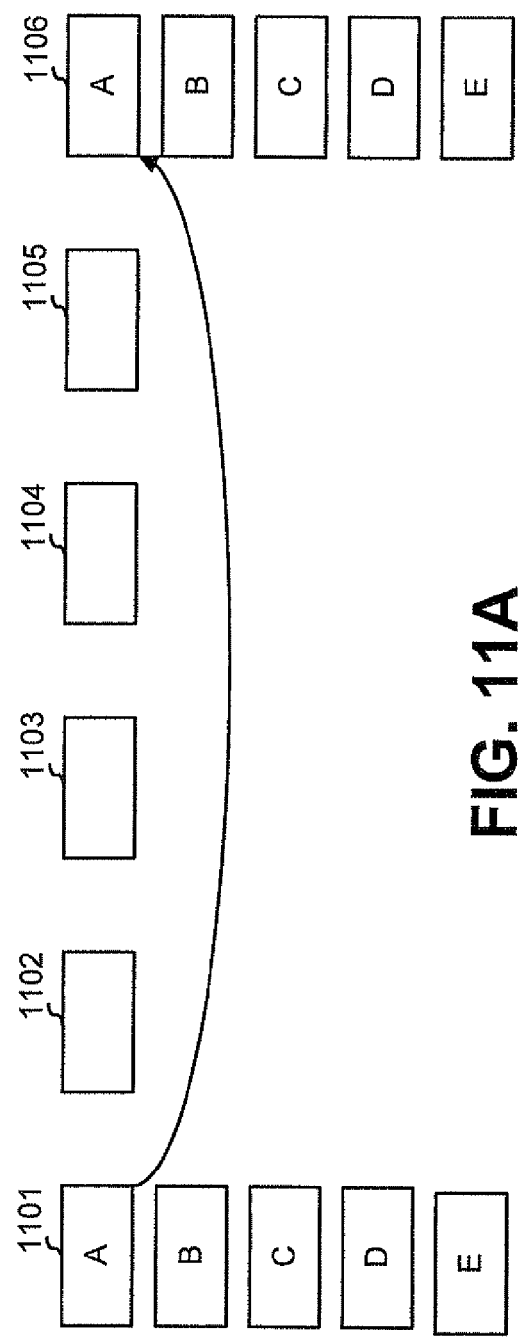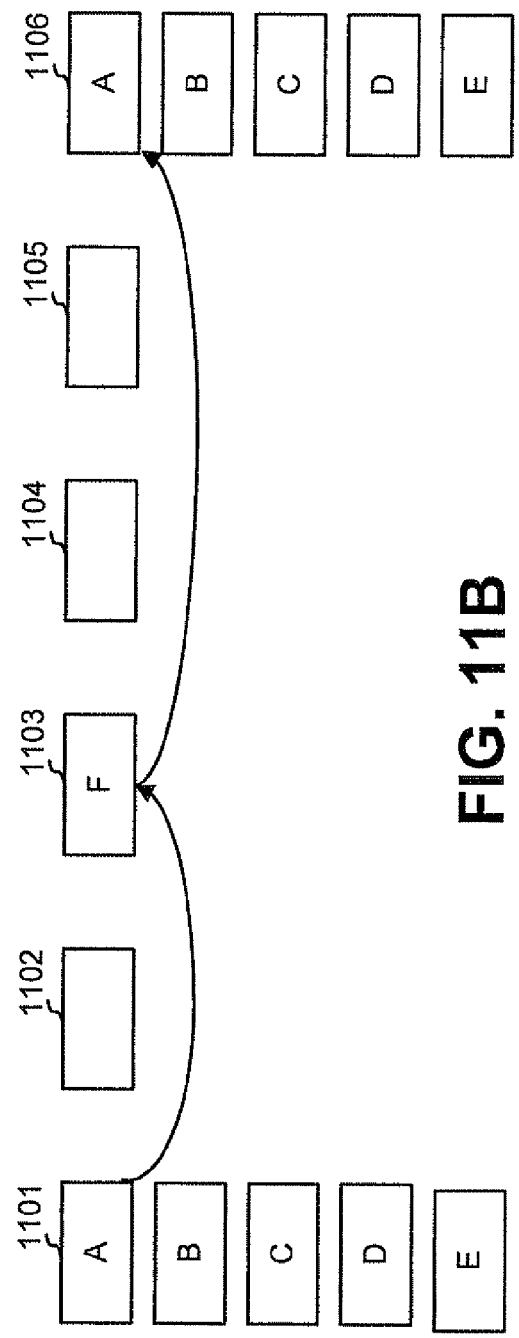

PRIORITY SCHEDULING USING PER-PRIORITY MEMORY STRUCTURES

RELATED APPLICATION

This application is a continuation of U.S. patent application Ser. No. 10/876,624, filed Jun. 28, 2004 (now U.S. Pat. No. 7,583,596), which is incorporated herein by reference.

BACKGROUND OF THE INVENTION

A. Field of the Invention

Concepts consistent with the invention relate generally to networking, and more particularly, to segmentation and reassembly (SAR) techniques for data units.

B. Description of Related Art

Segmentation and reassembly (SAR) is the process of breaking a data unit such as a packet, into smaller units, such as ATM cells, and later reassembling them into the proper order. Alternatively, a SAR system may receive ATM cells, reassemble the cells into packets, process the packets, and then break the processed packets into cells for re-transmission.

SAR systems are commonly used in networking environments. A router, for instance, may receive ATM cells over a network and reassemble the cells into packets. The packets may then be processed by, for example, analyzing each packet to determine its next destination address and output port. The router may then segment the packets back into fixed lengths cells, which are then transmitted on the network.

In a network router, multiple traffic flows may compete for limited network bandwidth. The router is faced with the task of allocating the total bandwidth available at a particular output port among the traffic flows. In the context of an ATM SAR system, the SAR may segment packet flows into ATM cells that correspond to multiple ATM virtual circuits. The virtual circuits contest for the bandwidth of the output port.

SUMMARY

According to one aspect consistent with principles of the invention, a device includes a number of queues to store data traffic flows, where the traffic flows are associated with different transmission priorities. The device further includes rate wheels assigned to the traffic flows on a per-priority basis, where each of the rate wheels includes sequentially arranged slots used to schedule the assigned traffic flows.

According to another aspect consistent with principles of the invention, a system includes an output port configured to transmit data from traffic flows that are each associated with a priority designation that designates a transmission priority. The system further includes a scheduling component that includes circular memory structures used to schedule traffic flows in sequential transmission slots included in each of the circular memory structures. The circular memory structures are assigned to the traffic flows on a per-priority basis. A priority decoder freezes de-queuing, when multiple ones of the circular memory structures attempt to de-queue to the output port in a same time slot, those of the circular memory structures that do not correspond to a highest priority of the multiple ones of the circular memory structures.

According to another aspect consistent with principles of the invention, a method de-queues data units scheduled from traffic flows that include different priority traffic flows. The method includes associating one or more circular memory structures with each of the different priority traffic flows. The method further includes de-queuing a first data unit from a first of the circular memory structures associated with a first one of the different priority traffic flows to an output port when the priority of the traffic flow of the first circular memory structure is a highest priority of the circular memory structures attempting to de-queue to the output port. Still further, the method includes freezing de-queuing of the first data unit from the first of the circular memory structures associated with the first one of the different priority traffic flows to the output port when the priority of the traffic flow of the first circular memory structure is not the highest priority of the circular memory structures.

BRIEF DESCRIPTION OF THE DRAWINGS

The accompanying drawings, which are incorporated in and constitute a part of this specification, illustrate the invention and, together with the description, explain the invention. In the drawings.

FIGS. 11A and 11B are diagrams that conceptually illustrate an exemplary set of de-queue operations;

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, data units, such as ATM cells, are efficiently scheduled for transmission using rate wheels. Different flows of data units may be assigned different transmission priorities. Different priority flows may be assigned to different rate wheels. Each rate wheel can schedule its output flows to maximize output bandwidth. Higher priority rate wheels with data to send may be de-queued before lower priority rate wheels.

System Overview

Figure 1:
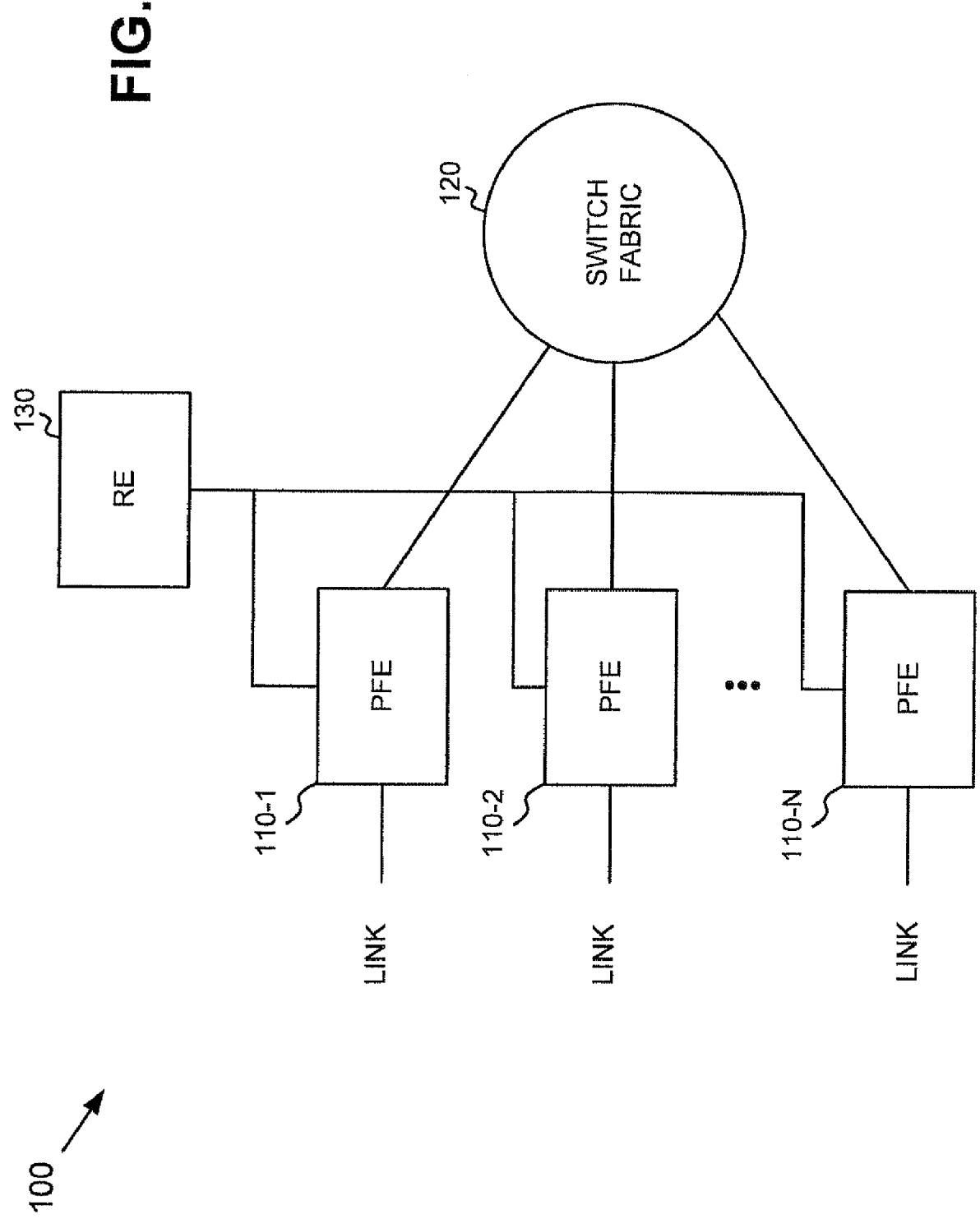
FIG. 1 is a block diagram illustrating an exemplary routing system in which concepts consistent with the principles of the invention may be implemented.

FIG. 1 is a block diagram illustrating an exemplary routing system 100 in which concepts consistent with the principles of the invention may be implemented. System 100 may receive one or more packet streams from physical links, process the packet stream(s) to determine destination information, and transmit the packet stream(s) out on links in accordance with the destination information. System 100 may include packet forwarding engines (PFEs) 110-1 through 110-N (collectively referred to as packet forwarding engines 110), a switch fabric 120, and a routing engine (RE) 130.

RE 130 may perform high level management functions for system 100. For example, RE 130 may communicate with other networks and/or systems connected to system 100 to exchange information regarding network topology. RE 130 may create routing tables based on network topology information, create forwarding tables based on the routing tables, and forward the forwarding tables to PFEs 110. PFEs 110 may use the forwarding tables to perform route lookups for incoming packets. RE 130 may also perform other general control and monitoring functions for system 100.

PFEs 110 may each connect to RE 130 and switch fabric 120. PFEs 110 may receive packet data on physical links connected to a network, such as a wide area network (WAN), a local area network (LAN), or another type of network. Each physical link could be one of many types of transport media, such as optical fiber or Ethernet cable. The data on the physical link is transmitted according to one of several protocols, such as the synchronous optical network (SONET) standard. The data may take the form of data units, where each data unit may include all or a portion of a packet. For ATM transmissions, for instance, the data units may be cells.

A PFE 110-x (where PFE 110-x refers to one of PFEs 110) may process incoming data units prior to transmitting the data units to another PFE or the network. To facilitate this processing, PFE 110-x may reassemble the data units into a packet and perform a route lookup for the packet using the forwarding table from RE 130 to determine destination information. If the destination indicates that the packet should be sent out on a physical link connected to PFE 110-x, then PFE 110-x may prepare the packet for transmission by, for example, segmenting the packet into data units, adding any necessary headers, and transmitting the data units from the port associated with the physical link.

Figure 2:
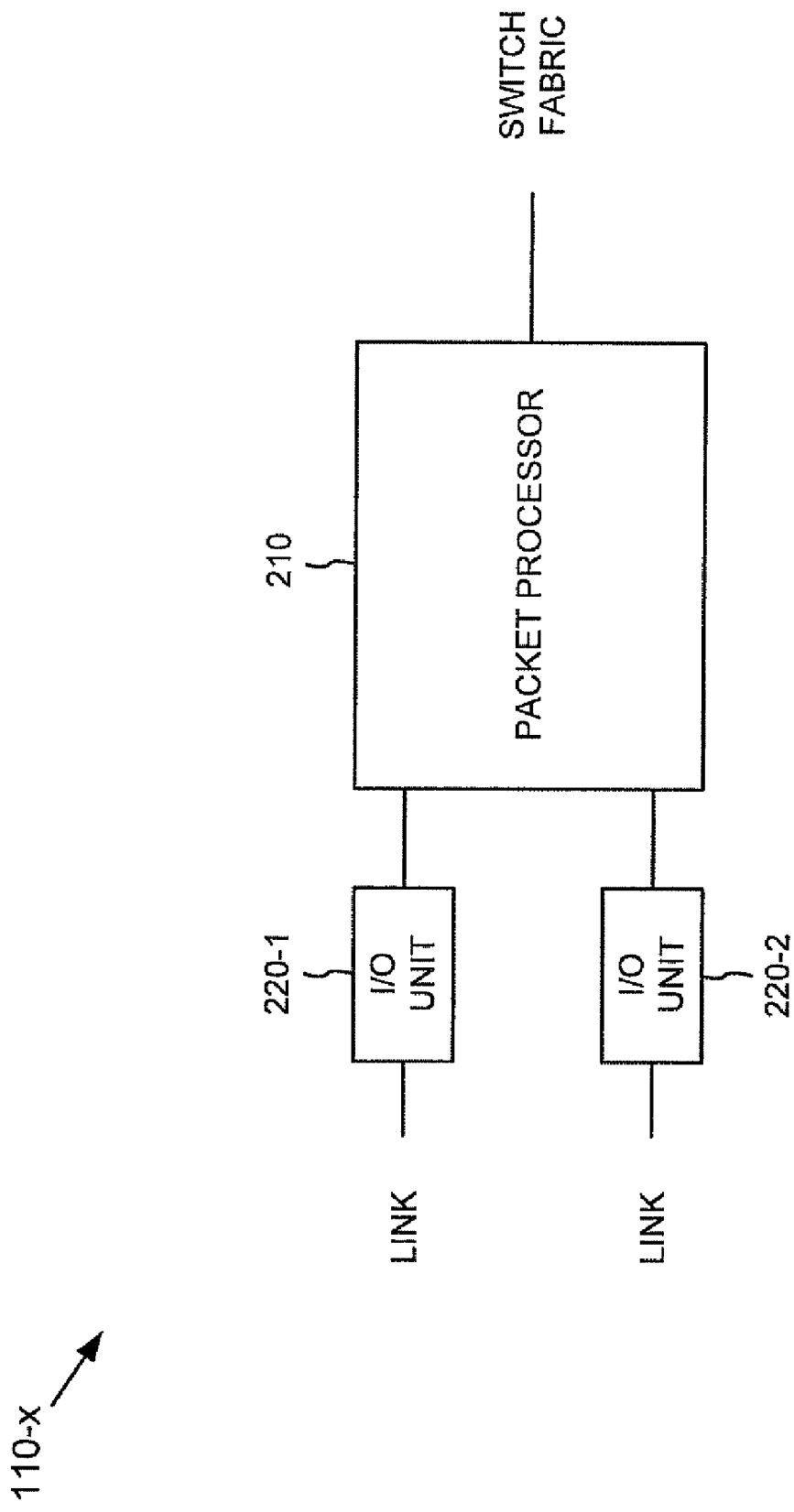
FIG. 2 is an exemplary block diagram of a portion of a packet forwarding engine of FIG. 1.

FIG. 2 is an exemplary block diagram illustrating a portion of PEE 110-x according to an implementation consistent with the principles of the invention. PFE 110-x may include a packet processor 210 and a set of input/output (I/O) units 220-1 through 220-2 (collectively referred to as I/O units 220). Although FIG. 2 shows two I/O units 220 connected to packet processor 210, in other implementations consistent with principles of the invention, there can be more or fewer I/O units 220 and/or additional packet processors 210.

Packet processor 210 may perform routing functions and handle packet transfers to and from I/O units 220 and switch fabric 120. For each packet it handles, packet processor 210 may perform the previously-discussed route lookup function and may perform other processing-related functions.

An I/O unit 220-y (where I/O unit 220-y refers to one of I/O units 220) may operate as an interface between its physical link and packet processor 210. Different I/O units may be designed to handle different types of physical links.

Figure 3:
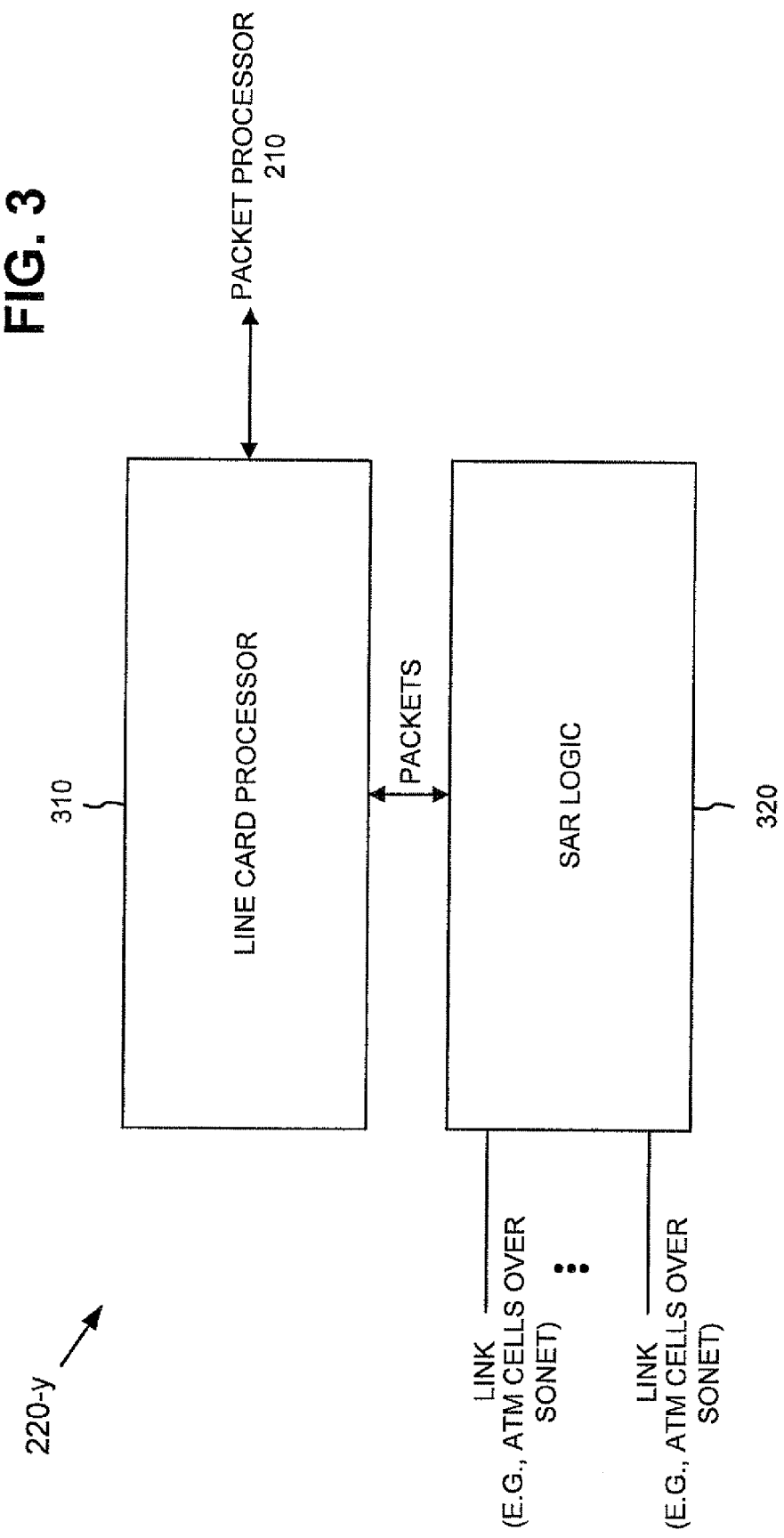
FIG. 3 is an exemplary block diagram of a portion of an input/output (I/O) unit of FIG. 2.

FIG. 3 is an exemplary block diagram of a portion of I/O unit 220-y according to an implementation consistent with the principles of the invention. In this particular implementation, I/O unit 220-y may operate as an interface to an ATM link.

I/O unit 220-y may include a line card processor 310 and segmentation and reassembly (SAR) logic 320. Line card processor 310 may process packets prior to transferring the packets to packet processor 210 or it may process packets from packet processor 210 before transmitting them to SAR logic 320. SAR logic 320 may segment packets received from line card processor 310 into data units (e.g., ATM cells) for transmission on the physical links (e.g., SONET links) and reassemble packets from data units received on the physical links. SAR logic 320 may send reassembled packets to line card processor 310.

Figure 4:
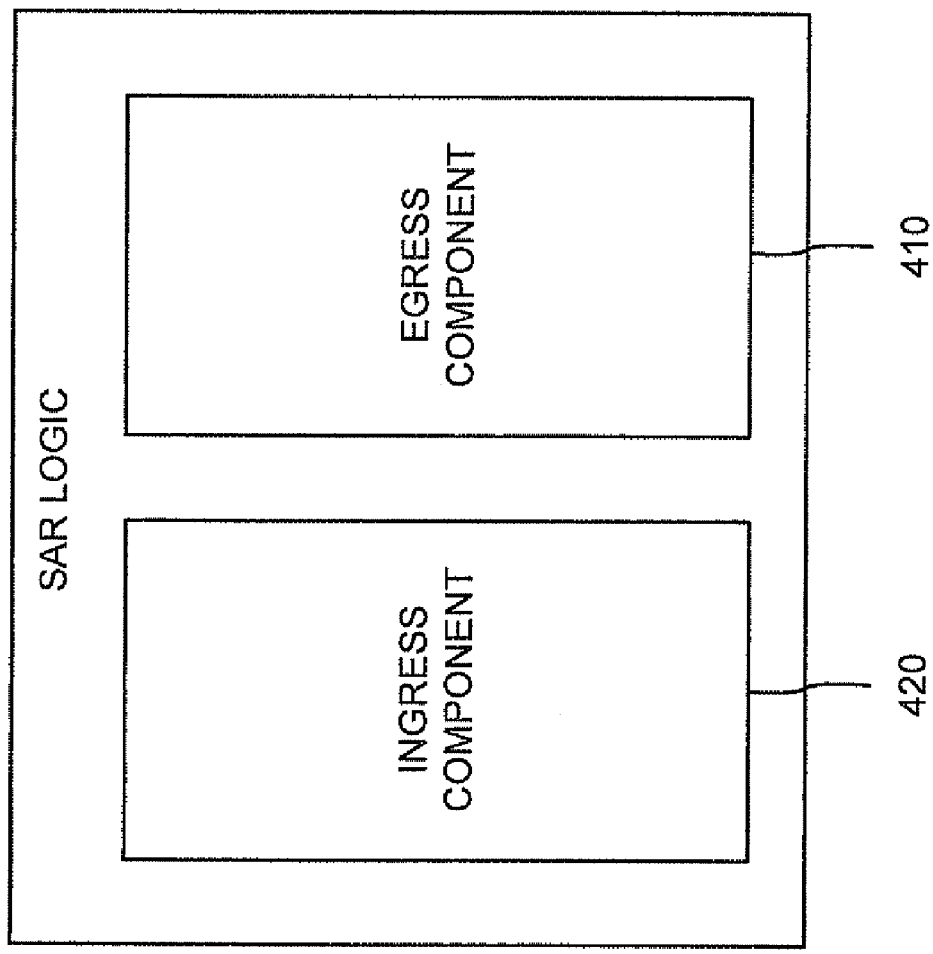
FIG. 4 is an exemplary block diagram of a portion of the segmentation and reassembly (SAR) logic of FIG. 3.

FIG. 4 is an exemplary diagram of a portion of SAR logic 320. SAR logic 320 may include an ingress component 420 and an egress component 410. Ingress component 420 may receive fixed sized data units, such as ATM cells, and reassemble the cells into a variable size data unit, such as packet data. Similarly, egress component 410 may receive variable size data units, such as packet data, and segment the packets into fixed sized data units, such as cells. The cells may be transmitted from system 100 via one or more output ports (not shown) connected to a physical link. For example, an output port may connect to an optical transmission medium, such as a SONET link having an optical carrier level of OC-12 (622.08 Mbps) or OC-3 (155.52 Mbps).

Ingress component 420 may receive data units on particular data flows and reassemble the data units into packets. To do this, ingress component 420 may maintain information regarding a data flow with which a packet is associated and associate each arriving data unit of the packet with that data flow. Ingress component 420 may process packets across multiple packet flows that are received at multiple associated input ports. Generally, each flow may be configured (provisioned) per port before ingress component 420 receives any data units associated with that flow.

The data units associated with a particular packet may arrive at various times. Each data unit may include a header and data. For ATM, the header may include a virtual circuit identifier (VCI) that identifies a particular virtual circuit with which the data unit is associated and a virtual path identifier (VPI) that identifies a particular virtual path with which the data unit is associated.

Figure 5:
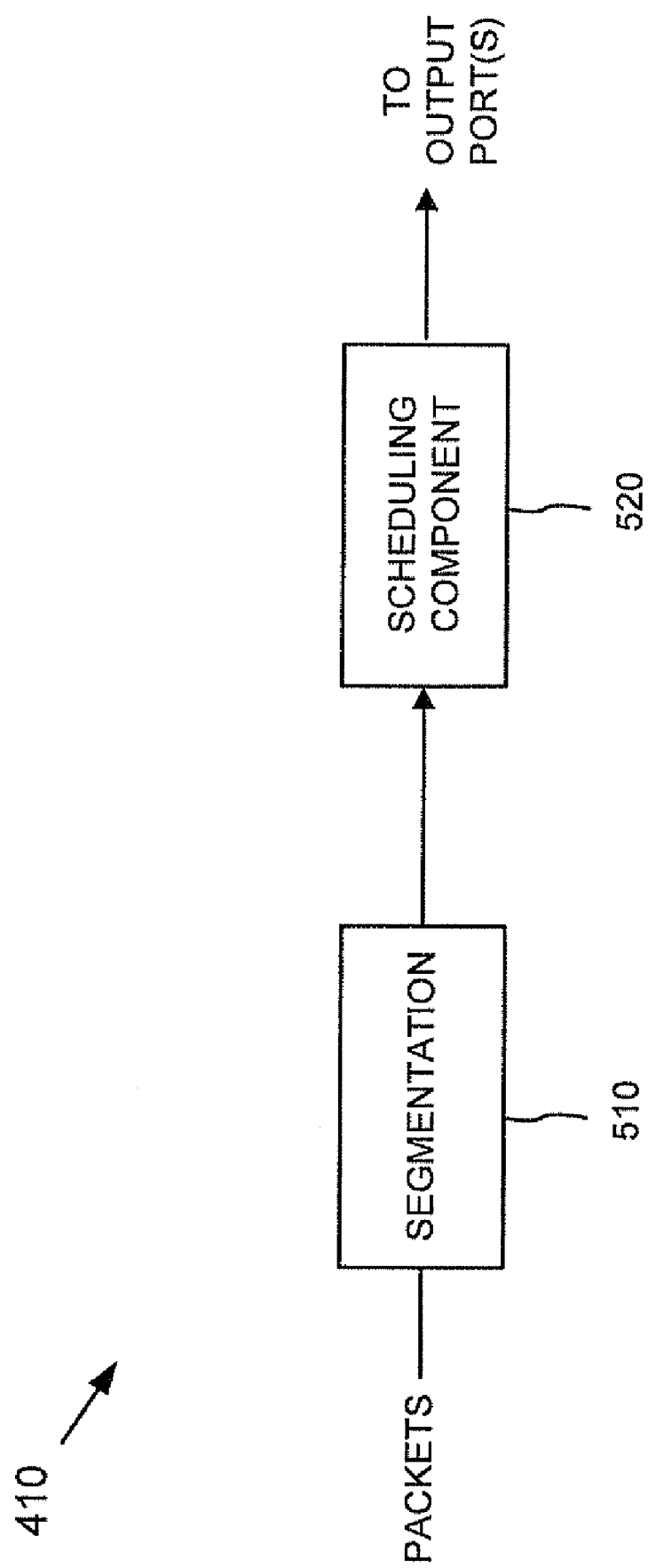
FIG. 5 is a diagram illustrating portions of the egress portion shown in FIG. 4 in additional detail.

FIG. 5 is a diagram illustrating portions of egress component 410 in additional detail. Egress component 410 may include a segmentation component 510 and a scheduling component 520. Segmentation component 510 may receive the input packets and segment the packets into fixed-length data units, which will be described herein as ATM cells, although other data unit formats could also be used. The cells may be output to scheduling component 520, which generally handles scheduling of the cells for transmission. The actual transmission may be handled by an output port(s), which puts the cells on the physical link.

Figure 6:
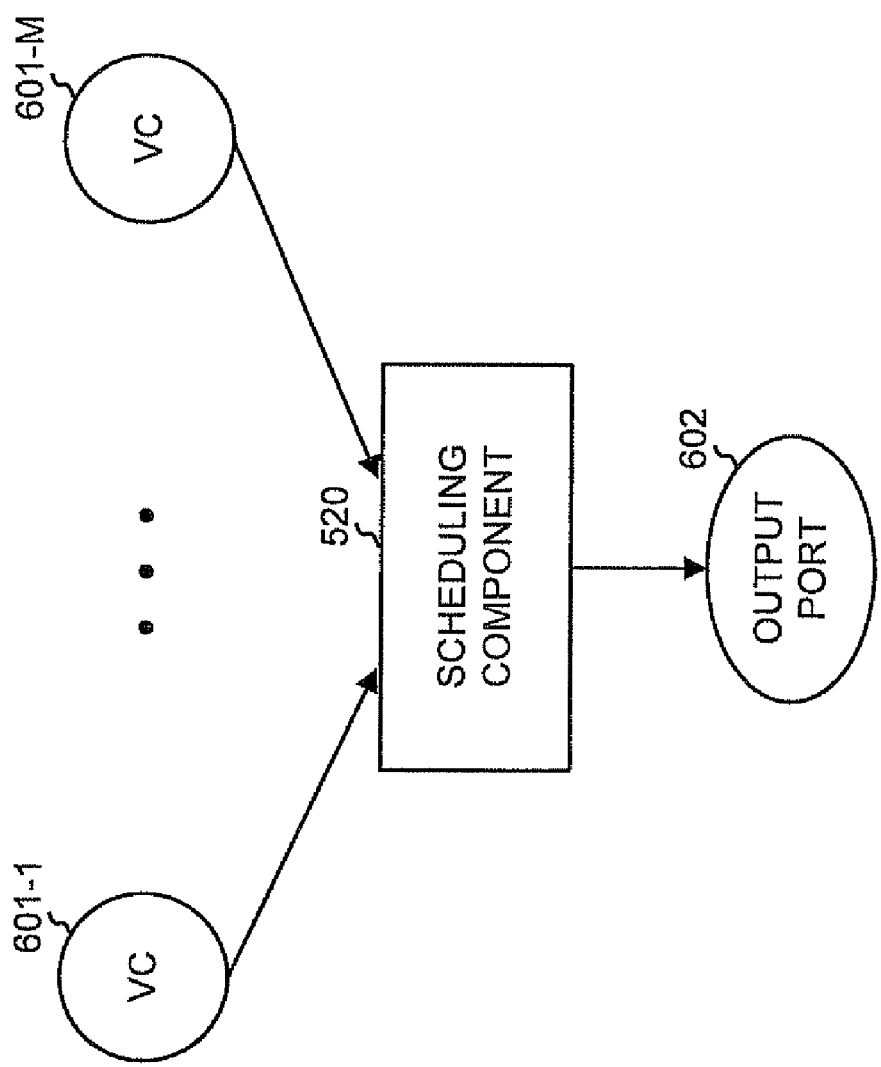
FIG. 6 is a diagram conceptually illustrating the operation of the scheduling component shown in FIG. 5 in additional detail.

FIG. 6 is a diagram conceptually illustrating the operation of scheduling component 520 in additional detail. The cells received from segmentation component 510 may be organized into a number of virtual circuits (VCs) 601-1 through 601-M (collectively referred to as virtual circuits 601), which may correspond to packet flows in the network. In general, a packet flow may be defined as packets having a set of common properties derived from the data contained in the packets. For example, a particular packet flow may be created to send data between two endpoints that desire a particular quality of service (QoS) level (e.g., a packet flow being used to carry a video transmission between two endpoints). Cells corresponding to packets in the packet flow may belong to one of VCs 601. Cells in different VCs 601 may contend for access to a particular output port, such as output port 602. Scheduling component 520 schedules the sequence of cells that are sent to this port.

VCs 601 may each be defined by a number of traffic shaping parameters. In particular, a VC may be defined by a Peak Cell Rate (PCR) value, a Sustainable Cell Rate (SCR) value, a Maximum Burst Size (MBS) value, and/or a Cell Delay Variation (CDV) value. The values for these parameters may differ between VCs. Scheduling component 520 attempts to schedule cells from each of VCs 601 such that the cells from each VC are sent to output port 602 in a manner that satisfies the traffic shaping parameters. In general, the traffic shaping parameters operate to control the availability of bandwidth to network users according to their traffic contracts and to define the spacing or interval between cells in order to mitigate buffering requirements.

Scheduling Component 520

Figure 7:
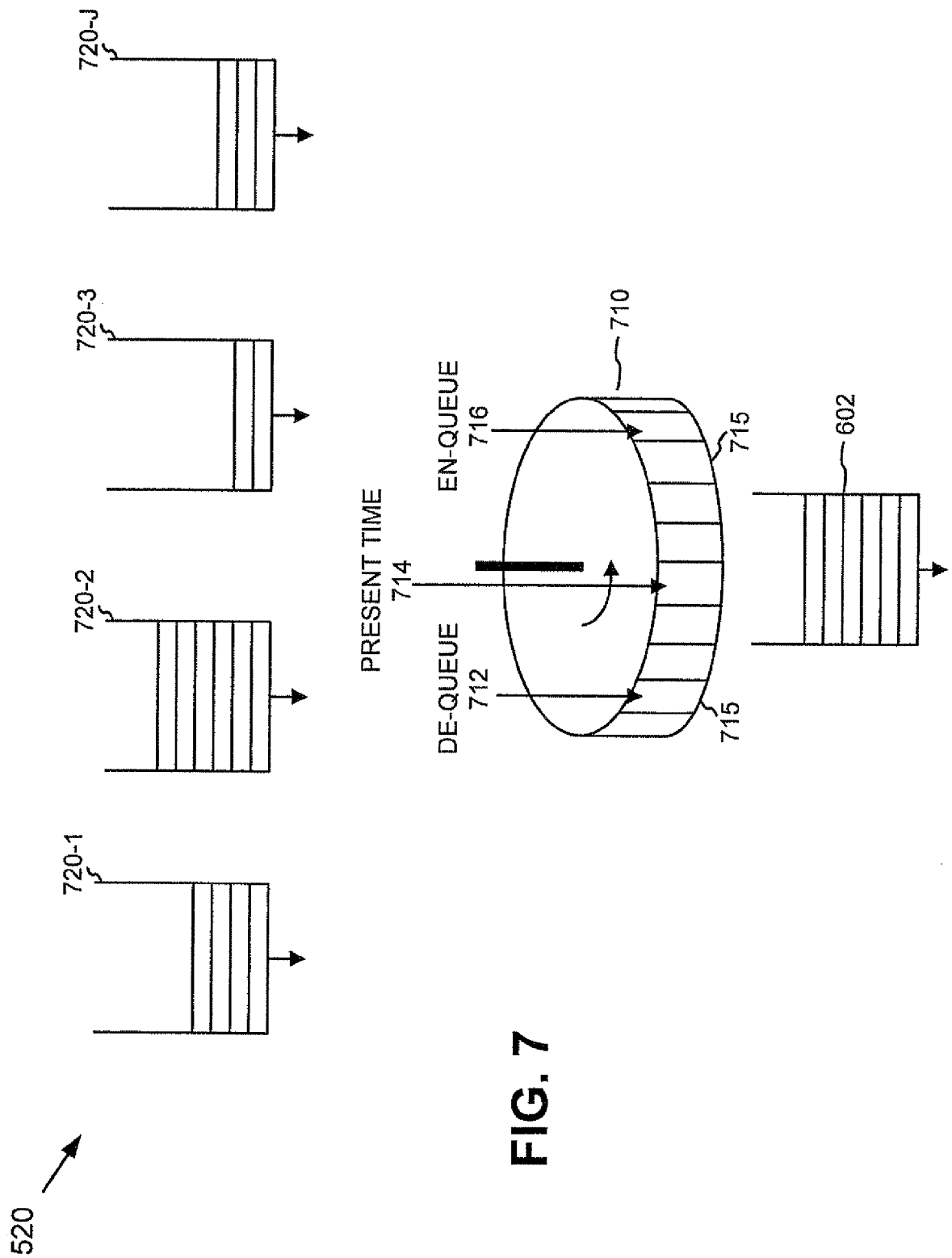
FIG. 7 is a diagram conceptually illustrating portions of the scheduling component shown in FIG. 5.

FIG. 7 is a diagram conceptually illustrating portions of scheduling component 520. More specifically, scheduling component 520 may use a rate wheel 710 to schedule cell traffic from VCs 601 to output port 602. Rate wheel 710 is conceptually illustrated in FIG. 7 as a "wheel" containing evenly spaced slots 715 in which cells are scheduled. In practice, rate wheel 710 may generally be implemented as a circular memory structure that may be maintained in random access memory or another type of computer-readable medium.

The various VCs 601 are illustrated in FIG. 7 as corresponding to queues 720-1 through 720-J (collectively referred to as queues 720). Queues 720 may be first-in first-out (FIFO) queues. One of queues 720 may correspond to a single VC or packet flow or, in some implementations, multiple packet flows that have the same traffic shaping parameters may be handled by a single queue.

A number of pointers may be associated with rate wheel 710. As shown, a de-queue pointer 712, a present time pointer 714, and an en-queue pointer 716 may each point to various slots on rate wheel 710. Pointers 712, 714, and 716 may each be maintained by scheduling component 520. De-queue pointer 712 indicates the current position on rate wheel 710 at which flows are being serviced. Cells being currently serviced are transferred to output port 602 for transmission on the link. Output port 602 may include an output buffer for queuing data for transmission. En-queue pointer 716 indicates the future position of each newly scheduled flow. Cells from one of queues 720 may be scheduled in slots on rate wheel 710 at evenly spaced slot intervals determined by the traffic shaping parameters corresponding to the queue. For example, the next slot that is to be scheduled for a queue may be based on the previously scheduled slot offset by the cell interval (e.g., 1/PCR) for the queue. If no cell from one of queues 720 is scheduled to be included on rate wheel 710 at a particular time interval corresponding to the slot, an "idle cell" may be included on the rate wheel for that slot. The idle cell may later be transmitted to output buffer 602. Idle cells are generally used to maintain the cell interval at the output port. Without idle cells, output buffer 602 may "collapse" the intended idle spacing between two cells and place them closer together than desired.

Present time pointer 714 may include a counter that increments at the cell rate (the rate corresponding to the interval at which cells are transmitted from the output port) or faster. The count value of present time pointer 714 may be stalled whenever the buffer in output port 602 is full. Thus, present time pointer 714 may increment at the "logical" cell rate (or faster) when room exists in output port 602. Because the counter of present time pointer 714 can operate faster than the cell rate, present time pointer 714 may stall and then "catch up" in order to keep output port 602 full.

The number of slots in rate wheel 710 may be based on the line rate of the output port relative to the slowest possible output rate. For an OC-12 SONET output port, for example, rate wheel 710 may be constructed using 16 k slots. For an OC-3 SONET output port, rate wheel 710 maybe constructed using 4 k slots.

Figure 8:
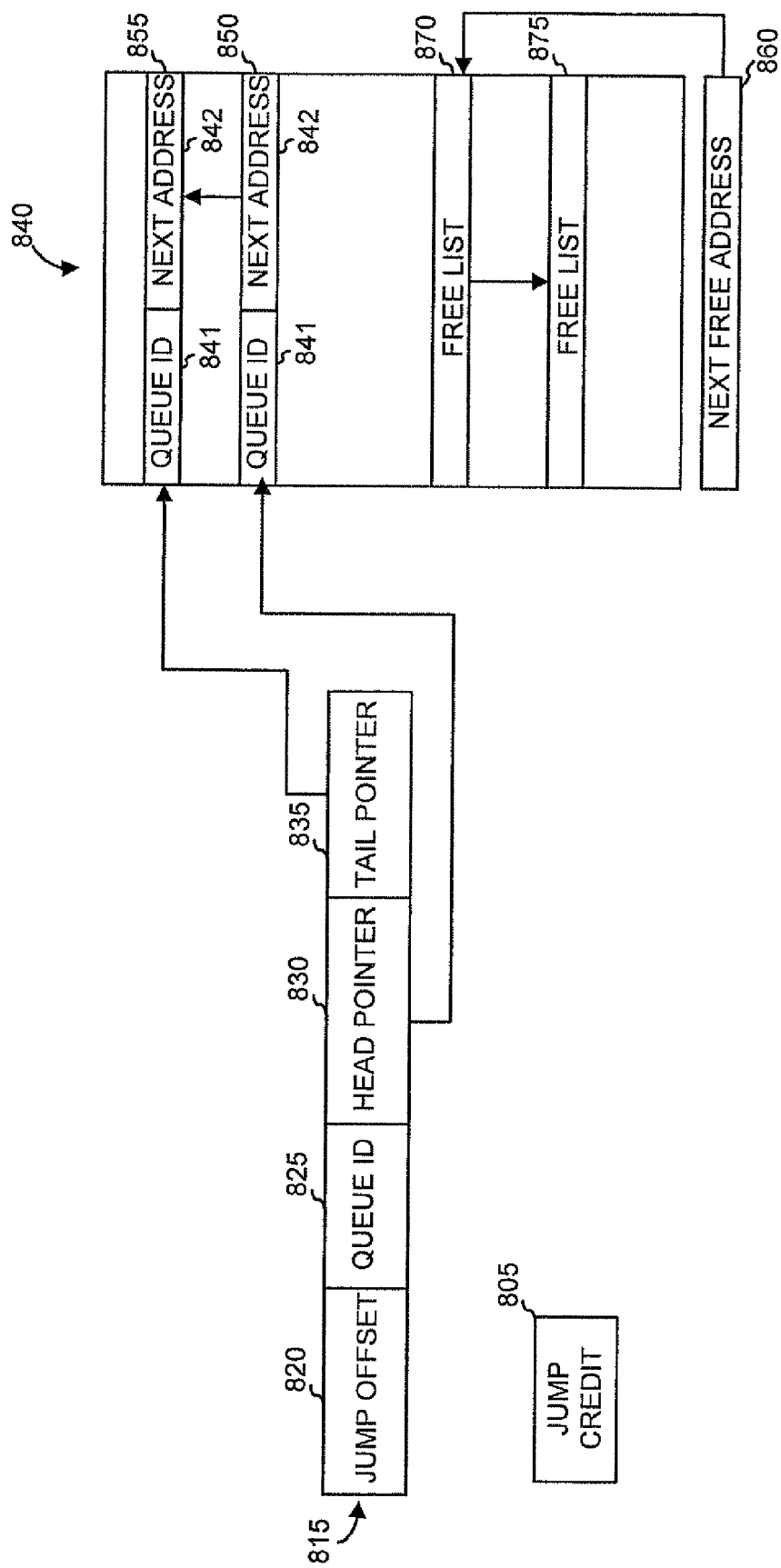
FIG. 8 is a diagram illustrating an exemplary slot in the rate wheel shown in FIG. 7 in additional detail.

FIG. 8 is a diagram illustrating one of the slots of rate wheel 710 (labeled as slot 815 in FIG. 8) in additional detail. Slot 815 may include a number of fields, shown as a jump offset field 820, a queue ID field 825, a head pointer field 830, and a tail pointer field 835. Slot 815, instead of physically storing the cell assigned to it, may instead store queue ID field 825, which acts as a pointer to the queue that contains the scheduled cell. In one implementation, a value of zero means that there is no cell scheduled in that slot (i.e., the slot is empty).

Because flows from multiple queues 720 are being scheduled, each with a potentially different cell transmission rate, it is possible that multiple flows will attempt to schedule a cell in the same slot. This is referred to herein as a "collision." Collisions may be handled by scheduling multiple cell transmissions in a single slot. Head pointer 830 and tail pointer 835 may be used to handle the collisions by pointing to a linked-list of additional queue ID fields. Such a linked-list is shown in FIG. 8 as list 840. Each entry in linked-list 840 may include a queue ID field 841, similar to queue ID field 825, and a pointer 842 to the next entry in linked-list 840. In the example list illustrated in FIG. 8, head pointer 830 points to entry 850 in linked-list 840. The queue ID 841 of entry 850 points to a second one of queues 720 that attempted to schedule a cell in slot 815. Pointer 842 of entry 850 points to another colliding entry 855—the third queue 720 that attempted to schedule a cell in slot 815. Tail pointer 835 may also point to entry 855, indicating that this is the last entry in the linked-list for this particular slot.

Scheduling component 520, when adding a colliding entry to linked list 840, may add the entry at the location of the next free address entry, which may be pointed-to by a next free address pointer 860. When the slot is later accessed and a colliding entry in linked list 840 is sent to output port 602, the entry is then classified as a free entry and added to the end of a linked-list of free entries. In FIG. 8, two free entries are illustrated (entries 870 and 875). When another entry becomes free, entry 875 may be modified to point to the free entry. Similarly, when entry 870 is taken and added to a slot, next free address pointer 860 may be modified to point to entry 875.

Jump offset value 820 is stored on a per-slot basis, and as will be described in more detail below, assists scheduling component 520 in "jumping" over empty slots on the rate wheel. By jumping over empty slots, scheduling component 520 can optimize the bandwidth utilization at output port 602. In addition to jump offset value 820, other values are stored by scheduling component 520 and used to assist in jumping over empty slots. Jump credit 805 is one such value. Unlike jump offset value 820, which is stored on a per-slot basis, jump credit 805 may be a global value that is stored by scheduling component 520 for each rate wheel 710.

Operation of Rate Wheel 710

Figure 9:
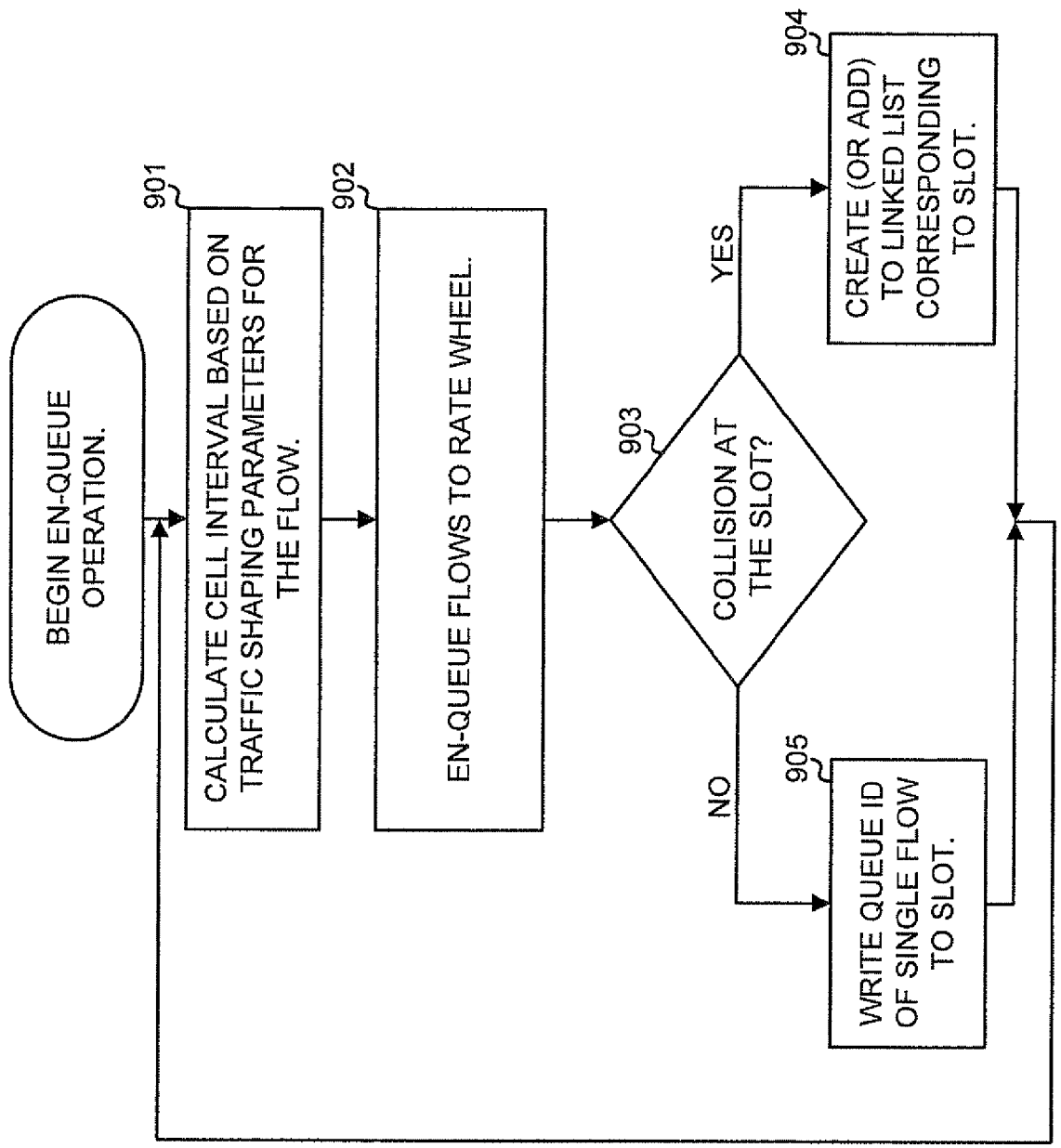
FIG. 9 is a flow chart illustrating exemplary operation of the scheduling component in en-queuing flows from the rate wheel.

FIG. 9 is a flow chart illustrating operation of scheduling component 520 in en-queuing flows from queues 720 to rate wheel 710. Flows may be scheduled based on a number of traffic shaping parameters (e.g., PCR, SCR, MBS, CDV). For each queue 720, scheduling component 520 may calculate a cell interval based on the traffic shaping parameters for the flow (act 901). For example, each slot on rate wheel 710 may be considered a cell slot on the link. Thus, if the traffic shaping parameters for a flow dictate that the flow should be sent at one-quarter the link rate, then scheduling component 520 will en-queue the queue ID 825 of the flow at every fourth slot.

Based on the calculated cell intervals, scheduling component 520 en-queues the flows, corresponding to queues 720, at the designated slots (act 902). En-queue pointer 716 points to a position on rate wheel 710 at which the particular queue ID is being written. En-queue pointer 716 advances around rate wheel 710 as the flows are written. Scheduling component 520 may ensure that en-queue pointer 716 does not wrap de-queue pointer 712 before writing to the next position.

Slots at which no flows are scheduled are empty cell slots. Empty cell slots, when transmitted to output port 602, will result in unused bandwidth on the physical link. Accordingly, it is desirable to minimize empty slots to the extent that the empty slots (idle cells) are not required to maintain a desired interval between cells.

Scheduling component 520 may locate collisions when multiple flows attempt to schedule a single slot (act 903). When a collision is found, scheduling component 520 writes the queue ID of the first flow to queue ID field 825 and adds the queue IDs of the remaining flows to linked-list 840, as previously discussed (act 904). When there is no collision, the queue ID of the single flow is written to queue ID field 825 (act 905). Head pointer 830 and/or tail pointer 835 may be given the value null, indicating that they do not point to any additional flows.

Figure 10:
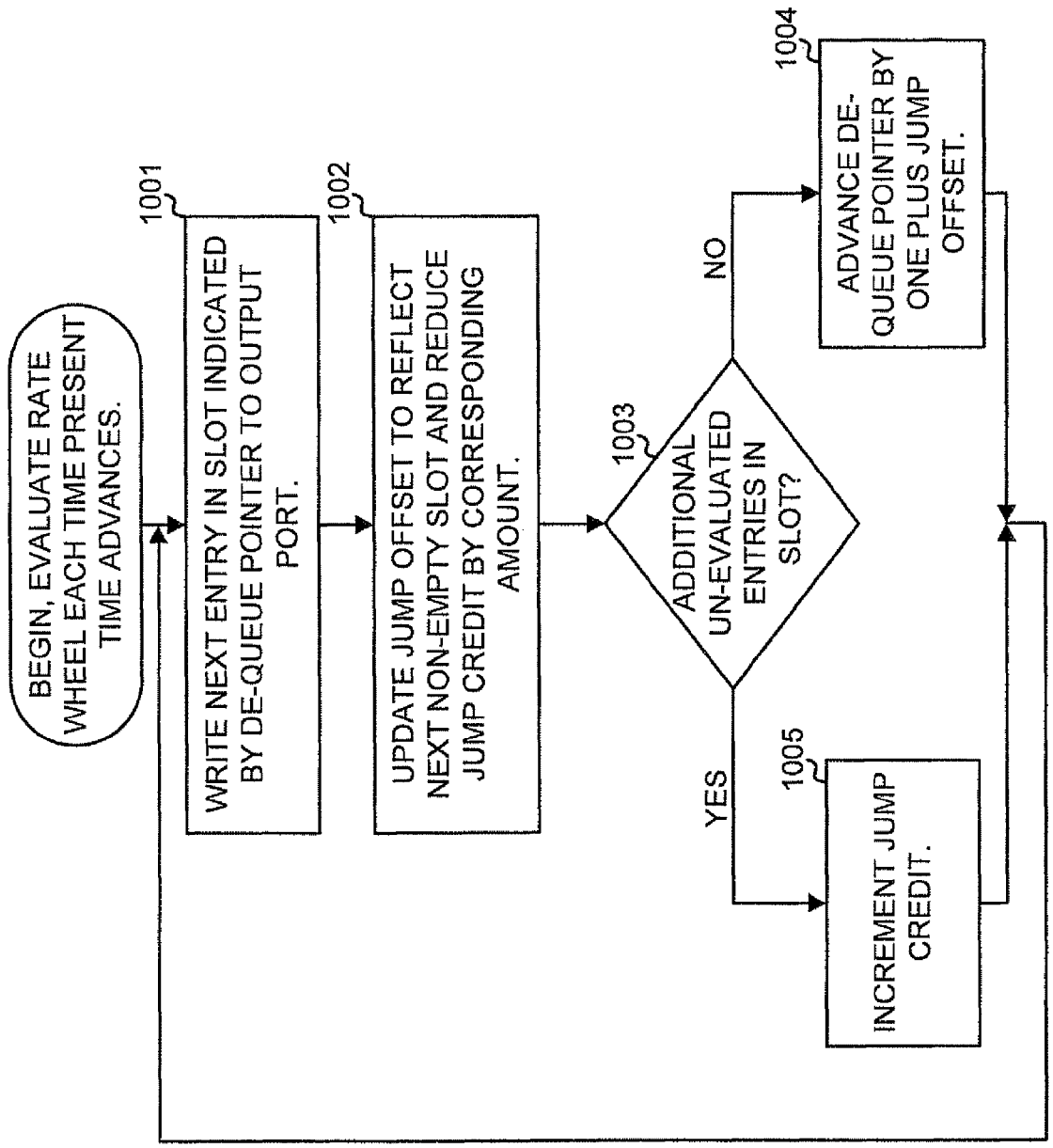
FIG. 10 is a flow chart illustrating exemplary operation of the scheduling component in de-queuing flows from the rate wheel.

FIG. 10 is a flow chart illustrating operation of scheduling component 520 in de-queuing flows from rate wheel 710. Rate wheel 710 may be evaluated each time present time counter 714 is advanced. As previously mentioned, present time pointer 714 may be advanced at a rate faster than the rate of output port 602. When the buffer in output port 602 is full, present time pointer 714 may not advance.

Scheduling component 520 may write the next entry in the slot indicated by de-queue pointer 712 to output port 602 (act 1001). In particular, the next cell from the queue corresponding to queue ID 825 of the current slot is written to output port 602. De-queue pointer 712 is advanced as the cells are written to output port 602. The amount to advance de-queue pointer 712 depends on the value in jump offset field 820 and on whether the current slot is a collision slot Jump offset field 820 may contain a value that advances de-queue pointer 712 over empty slots and to the next non-empty slot when the last entry in a slot is processed.

The jump offset value for the slot may be updated to reflect the location of the next non-empty slot (act 1002). For example, if the next two slots on rate wheel 710 are empty and the third slot contains an entry, jump offset field 820 may be given a value of two, indicating that the next two slots can be "jumped." Jump credit field 805 is used to indicate how many slots are available to be jumped over, which should not be more than the number of accumulated collisions. As jump offset fields 820 are incremented, jump credit field 805 is correspondingly decremented. Accordingly, when updating jump offset field 820, this field may only be updated up to the value of jump credit field 805 (act 1002). In other words, jump offset field 820 can only be set to indicate a jump value up to the point to which jump credit field 805 indicates a jump credit is available.

If the current slot is a collision slot with additional, un-evaluated entries, jump credit field 805 is incremented (acts 1003 and 1005). De-queue pointer 712 is not advanced in this situation as there are more entries in the slot. However, if the current entry is the last entry in the slot, scheduling component 520 may advance de-queue pointer 712 by one plus the value of the jump offset value (acts 1003 and 1004). In the situation in which the jump offset value for the slot was not updated, the jump offset value is zero, resulting in de-queue pointer 712 advancing by one (act 1004).

FIGS. 11A and 11B are diagrams that conceptually illustrate an exemplary set of de-queue operations.

In FIG. 11A, assume that there are five flows, labeled as flows "A" through "E", each having traffic shaping parameters that dictate a fixed cell interval of five slots. Further assume that the five flows all collide in first slot 1101 of rate wheel 710. Flow A is placed in the primary entry in slot 1101 and flows B through E are placed in a linked-list of colliding entries. When de-queue pointer 712 reaches slot 1101, it will be stopped at slot 1101 for five cycles of present time pointer 716 as each of flows A through E are processed. Without the ability to jump slots, as described above with reference to FIG. 10, idle cells are emitted at slots 1102-1105 and sent to output port 602. As a result, only $5/9^{th}$ of available bandwidth would be used, and the rate achieved for each flow is $1/9^{th}$, rather than the desired $1/5^{th}$ of the available port rate. With the ability to jump slots, however, as described above, the jump offset value is incremented to a value of four and the de-queue pointer is advanced five slots (4+1) to advance to slot 1106. Accordingly, slots 1102-1105 are skipped after processing is completed at slot 1101. No idle cells are emitted, each flow is transmitted at the desired port rate, and the full output port bandwidth is used.

In FIG. 11B, assume that in addition to the five colliding flows A through E, an additional flow "F" is present. Flow F is scheduled at slot 1103. When de-queue pointer 712 reaches slot 1101, it will be stopped at slot 1101 for five cycles of present time pointer 716 as each of flows A through E are processed. The jump offset value for slot 1101 will be set to point to the next non-empty slot, slot 1003. Jump credit 805 will have additional credits available after setting the offset pointer for slot 1101, however, as four flows collided in slot 1101, but the next non-empty slot is only two slots ahead of slot 1101. Accordingly, the jump offset value for slot 1103 is set to point to slot 1106. In this manner, a linked-list of jump slots are created by which empty slots can be skipped to fully use the bandwidth at output port 602.

Scheduling of Prioritized Packet Flows

As previously discussed, data flows are stored in queues 720 that have their output transmissions scheduled using a rate wheel 710. Collisions in slots on rate wheel 710 may be handled by placing multiple colliding cells in a single slot and then transmitting the cells in a first-in first-out order when de-queue pointer 712 reaches the slot with the colliding cells.

In some implementations, however, it may be desirable to use traffic flows that are assigned priority levels, such as priority levels based on traffic class. The flow priorities define the order in which flows should be handled when multiple flows contend for a link. Common traffic classes include constant bit rate (CBR), variable bit rate (VBR), and unspecified bit rate (UBR). Of these three classes, CBR has the highest priority and UBR the lowest. Thus, CBR cells that are scheduled for transmission should be sent before any colliding VBR and UBR cells. Similarly, VBR cells that are scheduled for transmission should be sent before any colliding UBR cells.

Figure 12:
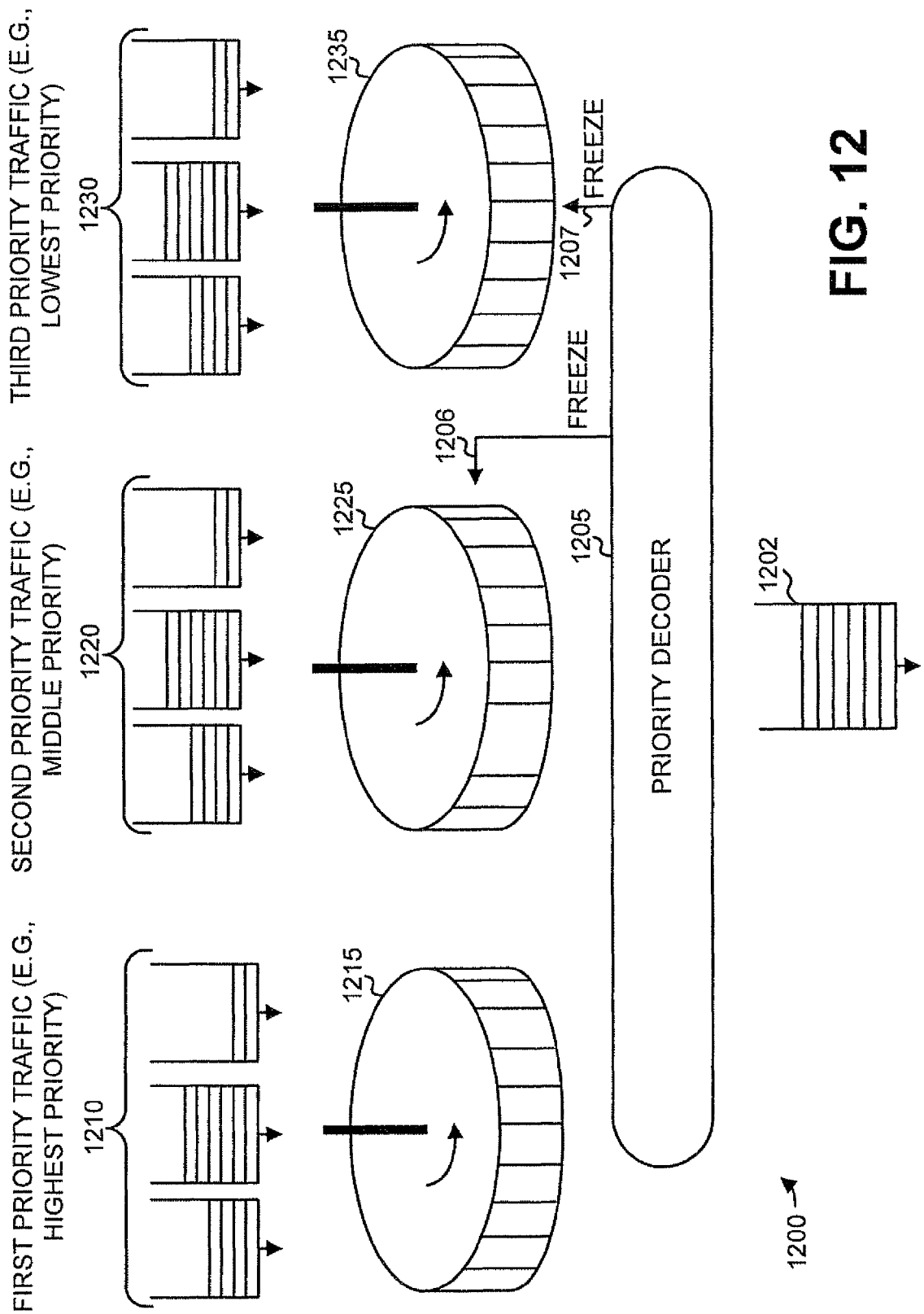
FIG. 12 is a diagram illustrating an implementation of a scheduling component for handling different traffic priority classes consistent with an aspect of the invention.

FIG. 12 is a diagram illustrating an exemplary implementation of a scheduling component 1200 for handling different traffic priority classes consistent with an aspect of the invention. Three different traffic priority classes are illustrated in FIG. 12, although in general, two or more different priority classes may be implemented. Each priority class is associated with a separate rate wheel and corresponding input queues. Queues 1210 and rate wheel 1215 may service a first traffic priority class (e.g., CBR highest priority), queues 1220 and rate wheel 1225 may service a second traffic priority class (e.g., VBR-middle priority), and queues 1230 and rate wheel 1235 may service a third priority class (e.g., UBR-lowest priority).

Within each priority class, the corresponding queues and the rate wheel generally operate as previously discussed in reference to the case of a single rate wheel. In particular, each rate wheel 1215, 1225, and 1235 may be associated with a de-queue pointer, a present time pointer, and an en-queue pointer (not shown in FIG. 12).

Each of rate wheels 1215, 1225, and 1235 may schedule their slots to an output buffer 1202, which may be an output buffer corresponding to an output physical link (similar to output buffer 602).

Priority decoder 1205 may arbitrate between rate wheels 1215, 1225, and 1235. More specifically, when multiple rate wheels 1215, 1225, or 1235 have a non-idle cell to send in a single slot to output buffer 1202, a cross-wheel collision occurs. Priority decoder 1205 allows the highest priority contending rate wheel to send during such a collision. Priority decoder 1205 may instruct the lower priority colliding wheels to suspend offloading to output buffer 1202. In one implementation, priority decoder may activate a "freeze" signal on one or more of signal lines 1206 and 1207. A rate wheels that receives the freeze signal may suspend its present time counter, effectively suspending operation of the rate wheel.

Figure 13:
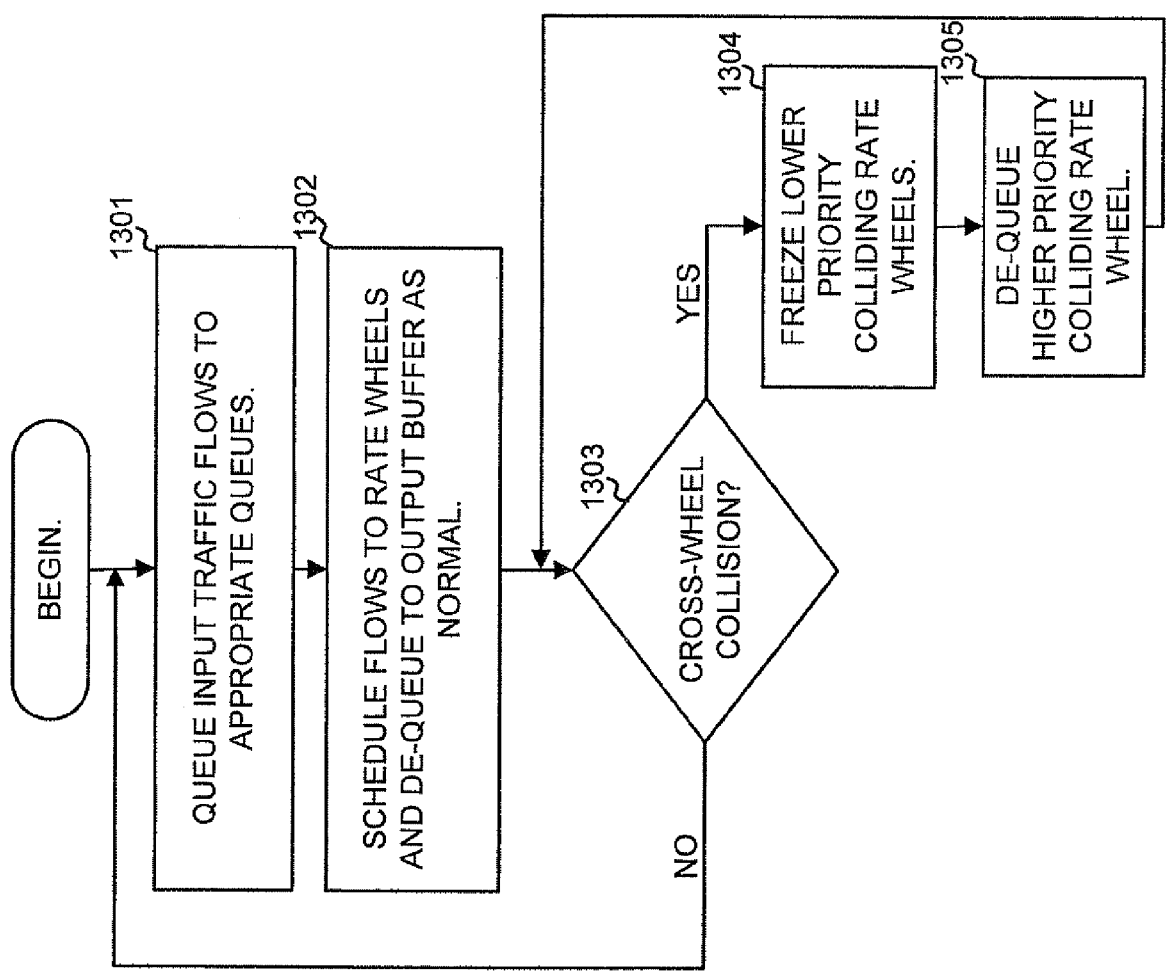
FIG. 13 is a flow chart illustrating exemplary operation of the system shown in FIG. 12.

FIG. 13 is a flow chart illustrating exemplary operation of the system shown in FIG. 12. Scheduling component 520 (FIG. 5) begins by queuing traffic flows to their appropriate queues 1210, 1220, or 1230 based on the priority class and other traffic shaping parameters of the flows (act 1301). As mentioned above, flows belonging to a particular priority class will be assigned to a rate wheel dedicated to that class. For each rate wheel, flows may be assigned to different queues based on the various traffic shaping parameters of the flows.

Each of the rate wheels, such as rate wheels 1215, 1225, and 1235, generally operate as described above with reference to FIGS. 7-11 in scheduling data to the rate wheels (act 1302). That is, each rate wheel schedules flows on its various slots. Multiple colliding flows in a slot are scheduled using a linked-list to store the flows. The rate wheels may jump over idle slots to the extent of a number of accumulated collisions.

Priority decoder 1205 may determine when cross-wheel collisions occur in contending for output buffer 1202 (act 1303). If a cross-wheel collision occurs, priority decoder 1205 may output freeze signal 1206/1207 to the lower priority colliding rate wheel(s), (act 1304), causing this rate wheel(s) to suspend its/their present time counter. For example, if rate wheel 1215 (CBR) and rate wheel 1235 (UBR) would both like to transmit a non-idle cell to output buffer 1202, freeze signal line 1207 is activated to rate wheel 1235. The highest priority colliding rate wheel, rate wheel 1215 in this example, transmits to output buffer 1202 as normal (act 1305). As another example, if rate wheels 1215, 1225, and 1235 would all like to transmit a non-idle cell to output buffer 1202, freeze signal lines 1206 and 1207 are activated.

It can be appreciated that the highest priority rate wheel (e.g., rate wheel 1215) will never be frozen by priority decoder 1205. Thus, from its perspective, rate wheel 1215 operates identically to the case of a single rate wheel.

In an alternate implementation to that described above, instead of suspending the present time counter while the freeze signal is active, the rate wheels may keep the present time pointer active but suspend de-queuing.

VBR flows are flows that are allowed to be scheduled from the input queues (e.g., queues 1220) at a variable rate. For a rate wheel that services VBR flows, the flow scheduling algorithm may be modified to allow it to make-up for suspended time periods due to collisions with higher priority rate wheels.

Figure 14:
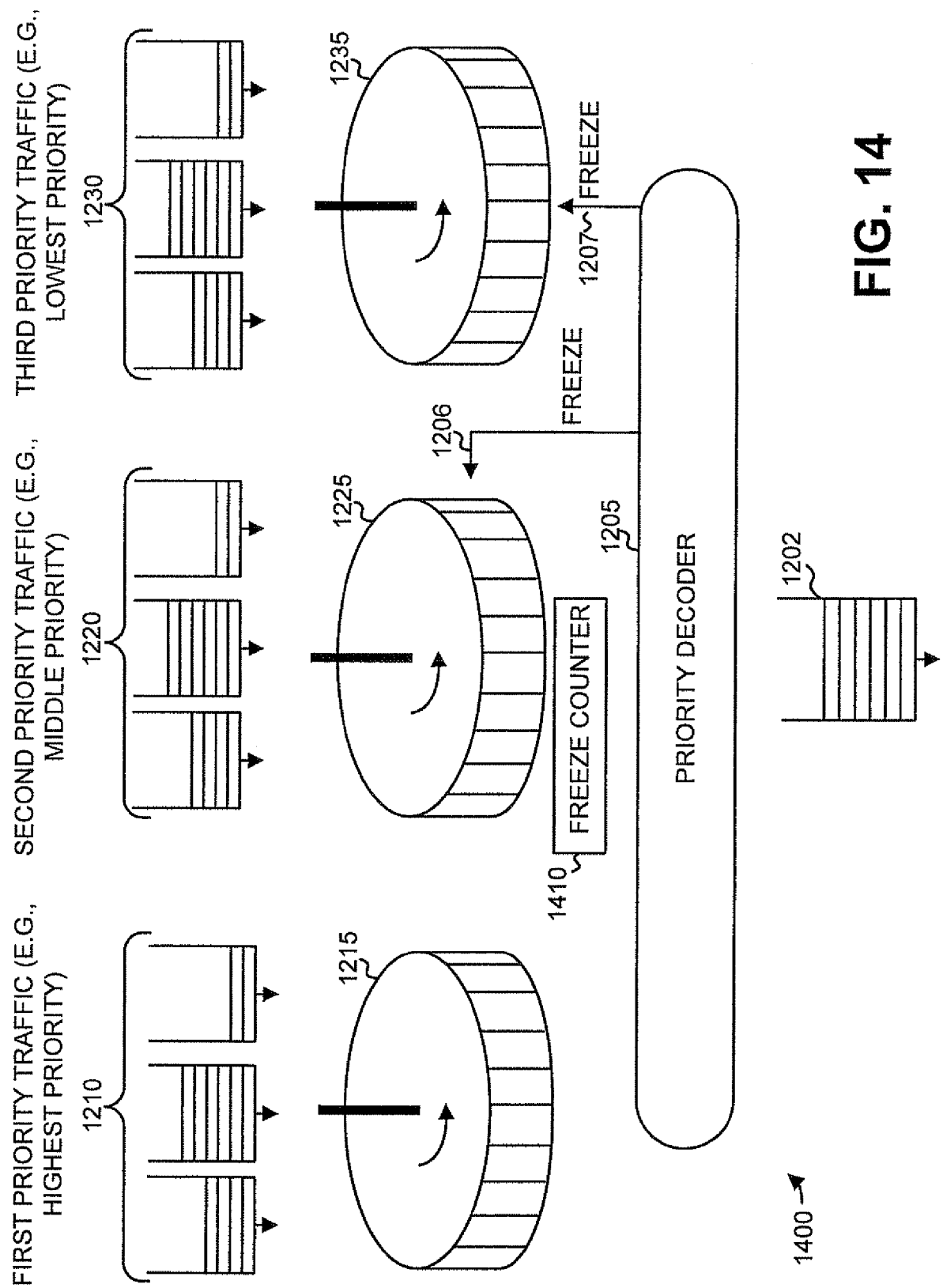
FIG. 14 is a diagram illustrating an exemplary scheduling component for handling different traffic priority tosses consistent with another aspect of the invention.

FIG. 14 is a diagram illustrating an exemplary scheduling component 1400 for handling different traffic priority classes, including the ability to make-up for suspended slots in variable rate flows. Scheduling component 1400 is similar to scheduling component 1200, except that a freeze counter 1410 is additionally included for each rate wheel that has the ability to make-up for suspended slots (i.e., queues 1220 and corresponding rate wheel 1225). Freeze counter 1410 may keep a credit of how far behind in time its rate wheel is relative to the highest priority rate wheel. Thus, freeze counter 1410 may be incremented based on the present time pointer of the highest priority queue whenever its freeze signal line (i.e., line 1206) is active. Scheduling component 1400, when offloading flows from VBR queues 1220, may correspondingly increase the flow rate of one or more of the queues to compensate for the "lost time" indicated by freeze counter 1410. Freeze counter 1410 may be correspondingly decremented to account for the increased flow rate. In this manner, the desired average cell rate for the variable rate flows can be maintained, even when higher priority flows preempt the variable rate flows (assuming the link is not oversubscribed). In general, although freeze counter 1410 was described in the context of VBR data flows, freeze counter 1410 may be used with any set of data flows that permit variable transmission rates.

Conclusion

A circular memory structure, called a rate wheel herein, was described that efficiently schedules data units. Different rate wheels may schedule data units for different priority traffic flows.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been presented with respect to FIGS. 9, 10, and 13, the order of the acts may be different in other implementations consistent with principles of the invention. Also, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed:

1. A device comprising:
   a plurality of queues to store data traffic flows that are associated with different transmission priorities;
   a plurality of rate wheels, each rate wheel assigned to one or more queues, of the plurality of queues, having a common transmission priority, each of the rate wheels including a plurality of sequentially arranged slots used to schedule the assigned traffic flows of the one or more queues to which the rate wheel is assigned; and
   an output port coupled to the plurality of rate wheels, the output port receiving data of the traffic flows, from the plurality of rate wheels, in an order that is determined based on the transmission priorities associated with the data traffic flows.

2. The device of claim 1, where the different transmission priorities include at least two of a constant bit rate (CBR) priority, a variable bit rate (VBR) priority, or an unspecified bit rate (UBR) priority.

3. The device of claim 1, further comprising:
   a priority decoder to:
      monitor the slots on the plurality of rate wheels for collisions between rate wheels attempting to output data to the output port, and
      stop the output of data to the output port for those of the colliding rate wheels that are not a highest priority one of the colliding rate wheels.

4. The device of claim 1, where the output port transmits the data over an optical link.

5. The device of claim 1, further comprising, for each of the plurality of rate wheels:
   a de-queue pointer to point to a position on the rate wheel that is currently active for de-queuing the traffic flows from the rate wheel.

6. The device of claim 1, further comprising, for each of the plurality of rate wheels:
   an en-queue pointer to point to a position on the rate wheel that is currently active for en-queuing the traffic flows to the rate wheel.

7. The device of claim 1, where the traffic flows are associated with traffic shaping parameters that include values relating to a Peak Cell Rate, a Sustainable Cell Rate, a Maximum Burst Size, or a Cell Delay Variation.

8. A method comprising:
   scheduling traffic flows to a plurality of circular memory structures, where each circular memory structure of the plurality of circular memory structures is associated with traffic flows having a common transmission priority;
   monitoring slots on the plurality of circular memory structures for collisions between circular memory structures attempting to output data to an output port at the same time;
   stopping the output, to the output port, of data for circular memory structures of the colliding circular memory structures that are not associated with traffic flows having a highest transmission priority; and
   outputting, to the output port, data of the circular memory structure of the colliding circular memory structure that is associated with traffic flows having the highest transmission priority.

9. The method of claim 8, where scheduling the traffic flows comprises:
   scheduling the traffic flows based on traffic shaping parameters assigned to the traffic flows.

10. The method of claim 8, further comprising:
    receiving packets belonging to the traffic flows and segmenting the packets into fixed-length data units.

11. The method of claim 10, where the fixed-length data units are ATM cells.

12. The method of claim 8, where scheduling the traffic flows includes scheduling traffic flows from a plurality of queues, where traffic from queues having a common transmission priority are scheduled to a particular circular memory structure of the plurality of circular memory structures.

13. The method of claim 8, where the circular memory structures include rate wheels.

14. The method of claim 8, where the traffic flows are associated with traffic shaping parameters defined by at least one of a Peak Cell Rate, a Sustainable Cell Rate, a Maximum Burst Size, or a Cell Delay Variation.

15. The method of claim 8, further comprising:
    storing, for each circular memory structure of a particular group of circular memory structures, an indication of a number of times the associated circular memory structure was frozen.

16. The method of claim 15, further comprising:
    scheduling, based on a value of the counter, traffic flows at an increased rate to compensate for the number of times the each circular memory structure of the particular group of circular memory structures was frozen.

17. The method of claim 15, where the particular group of circular memory structures includes circular memory structures associated with variable bit rate transmissions.

18. A system comprising:
    an output port to transmit data from traffic flows that are each associated with a priority designation that designates a transmission priority; and
    a scheduling component including:
       a plurality of circular memory structures to schedule a plurality of traffic flows in sequential transmission slots included in each of the circular memory structures, each circular memory structure of the plurality of circular memory structures being assigned to the traffic flows having a common transmission priority, and
       a priority decoder to, when multiple ones of the circular memory structures attempt to de-queue to the output port in a same time slot, freeze de-queuing of the circular memory structures of the plurality of circular memory structures that do not correspond to traffic flows having a highest transmission priority.

19. The system of claim 18, further comprising:
    a segmentation component to receive packets belonging to the flows and segment the packets into fixed-length data units.

20. The system of claim 18, where the circular memory structures are rate wheels, and where the rate wheels each include:
    a de-queue pointer to point to an active one of the transmission slots for de-queuing traffic flows from the rate wheel, and
    an en-queue pointer to point to an active one of the transmission slots for en-queuing traffic flows to the rate wheel.

* * * * *